(12) United States Patent
Chang

(10) Patent No.: US 7,511,400 B2
(45) Date of Patent: Mar. 31, 2009

(54) DYNAMO SYSTEM HAVING A FREELY MOVING FLYWHEEL IN CIRCULAR TRACK

(75) Inventor: Hungkun James Chang, Hoffman Estates, IL (US)

(73) Assignee: Hungkun J. Chang, Hoffman Estates, IL (US)

( * ) Notice: Subject to any disclaimer, the term of this patent is extended or adjusted under 35 U.S.C. 154(b) by 518 days.

(21) Appl. No.: 11/412,378

(22) Filed: Apr. 27, 2006

(65) Prior Publication Data

US 2007/0252463 A1 Nov. 1, 2007

(51) Int. Cl.
*H02K 1/22* (2006.01)

(52) U.S. Cl. .......................... 310/261; 310/74; 310/153

(58) Field of Classification Search .................. 310/74, 310/153, 261, 40 R, 267
See application file for complete search history.

(56) References Cited

U.S. PATENT DOCUMENTS 5,353,655 A * 10/1994 Mishler ........................ 74/5 R
6,161,274 A * 12/2000 Stark et al. .................... 29/596

* cited by examiner

*Primary Examiner*—Hae Moon Hyeon

(57) ABSTRACT

A dynamo system comprises a flywheel mounted on a shaft intermediate its ends. A circular track in the dynamo system includes an inward groove structure to keep the ends of the shaft tracked inside while the flywheel rotating and spinning, the shaft's ends is dangling inside the circular track so that the shaft's ends will move freely along the circular course of the circular track while the flywheel rotates and spins.

6 Claims, 3 Drawing Sheets

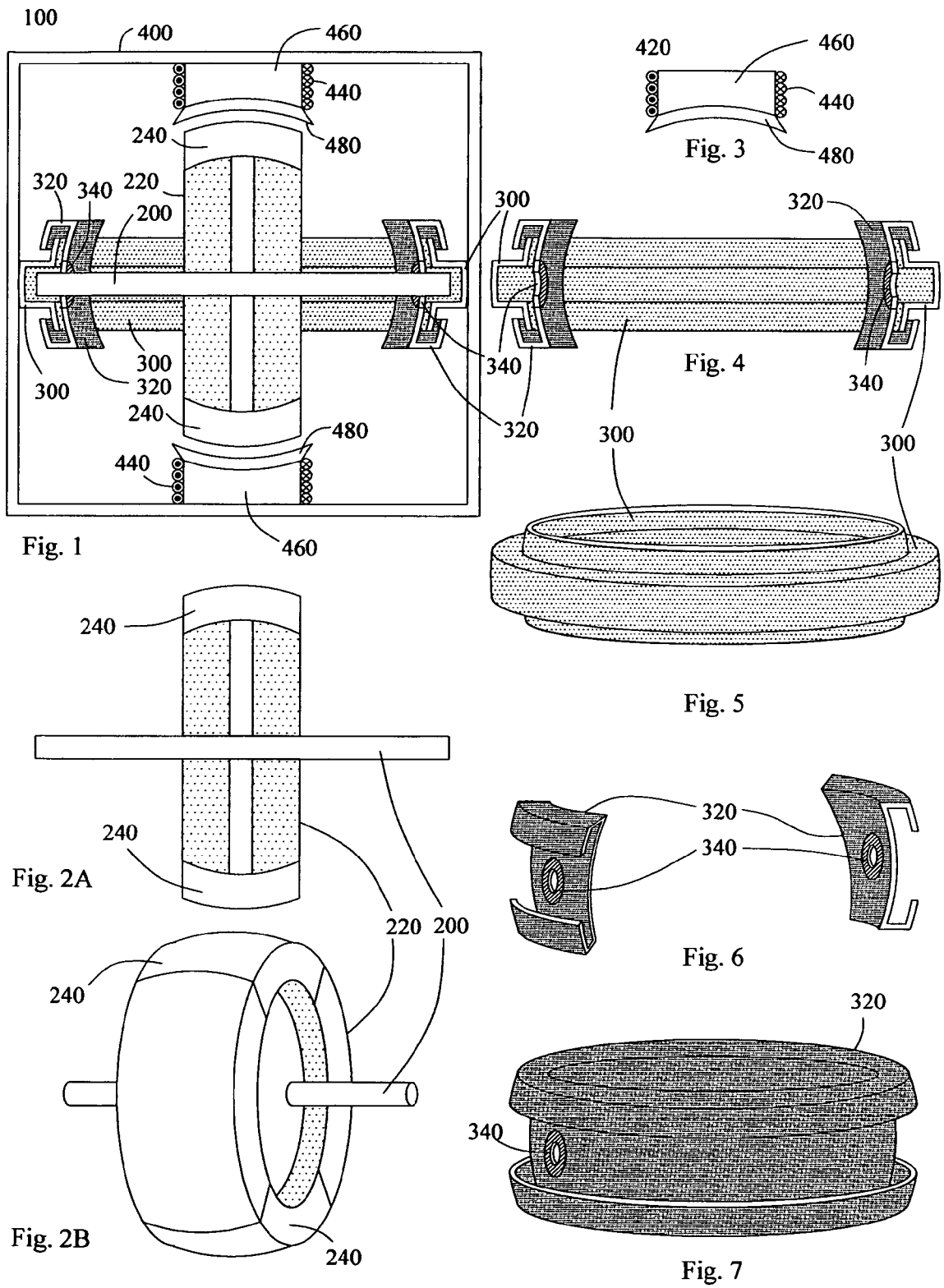

DYNAMO SYSTEM HAVING A FREELY MOVING FLYWHEEL IN CIRCULAR TRACK

CROSS-REFERENCE TO RELATED APPLICATIONS

Not applicable.

BACKGROUND

1. Field of Invention

This invention relates to improvements in the technology relating to inexpensive and reliable dynamo system for producing electrical energy and more particularly to a human powered dynamo system.

2. Description of Prior Art

A dynamo is a machine that converts mechanical energy into electrical energy by using the principle of magnetic induction. The amount of electrical energy generated depends on (1) the strength of the magnetic field, (2) the angle at which a conductor cuts the magnetic field, (3) the speed at which the relative movement between the conductor and the magnetic field, and (4) the length of the conductor within the magnetic field.

U.S. Pat. No. 6,808,288 B2 to Pat Y. Mah discloses a human powered flashlight by sliding a magnet through a coiled wire to obtain electrical energy for illuminating a flashlight. The back and forth sliding movement limits the relative speed between the magnet and the coiled wire. Also, such linear movement limits the frequency of passing the magnet through the coiled wire. In addition, the angle at which the coiled wire cutting the fluxes of the magnetic field is not optimal. Therefore, the amount of generated electrical energy is limited for low electrical energy consumption appliances, such as flashlight, etc.

A human powered cranking motion can apply to a rotor shaft of a gyro electrical generator for producing electrical energy as well. The modern gyro electrical generator is quite efficient in producing electrical energy at high speed rotation. However, human powered circular motion can only achieve limited turns of the rotor per minute. For powering handheld devices such as calculators, multimedia players, electronic notebooks, etc., the size and weight of the gyro electrical generator will exceed human's ability to operate.

SUMMARY

In accordance with the present invention a dynamo system comprises a flywheel mounted on a shaft intermediate its ends. A circular track means includes an inward groove structure to keep the ends of the shaft tracked inside while the flywheel rotating and spinning. The circular track means further includes a mechanism to allow a coupling means dangling around. The pair of coupling means for bearing the shaft ends and dangling the shaft ends inside the circular track means so that the shaft ends will move freely along the circular course of the circular track means while the flywheel rotating and spinning. The coupling means includes a bearing to carry a shaft's end. The coupling means further includes a mechanism to dangle the bearing around the course of the circular track means. A frame holds the circular track means. The cavity of the frame has sufficient space so that the flywheel can rotate and spin freely. A plurality of permanent or electro magnets are mounted in spaced relationship on the rim of the flywheel. And a plurality of armatures are mounted to the undersurfaces of the frame for producing induced electrical power when the magnets sweeping over. Therefore, the induced electrical power can be used by an external load. The dynamo system may be used as a motor to produce mechanical motion for an external drive.

DRAWING FIGURES

In the drawings, closely related figures have the same number but different alphabetic suffixes.

FIG. 1 shows a front cross sectional view of a dynamo system.

FIG. 2A shows a front cross sectional view of a flywheel and its shaft.

FIG. 2B shows the flywheel and its shaft.

FIG. 3 shows an armature.

FIG. 4 shows a front cross sectional view of an assembled set of a circular track and a pair of couplers.

FIG. 5 shows the circular track.

FIG. 6 shows the pair of couplers.

FIG. 7 shows an integrated coupler.

REFERENCE NUMERALS IN DRAWINGS

Figure 8:
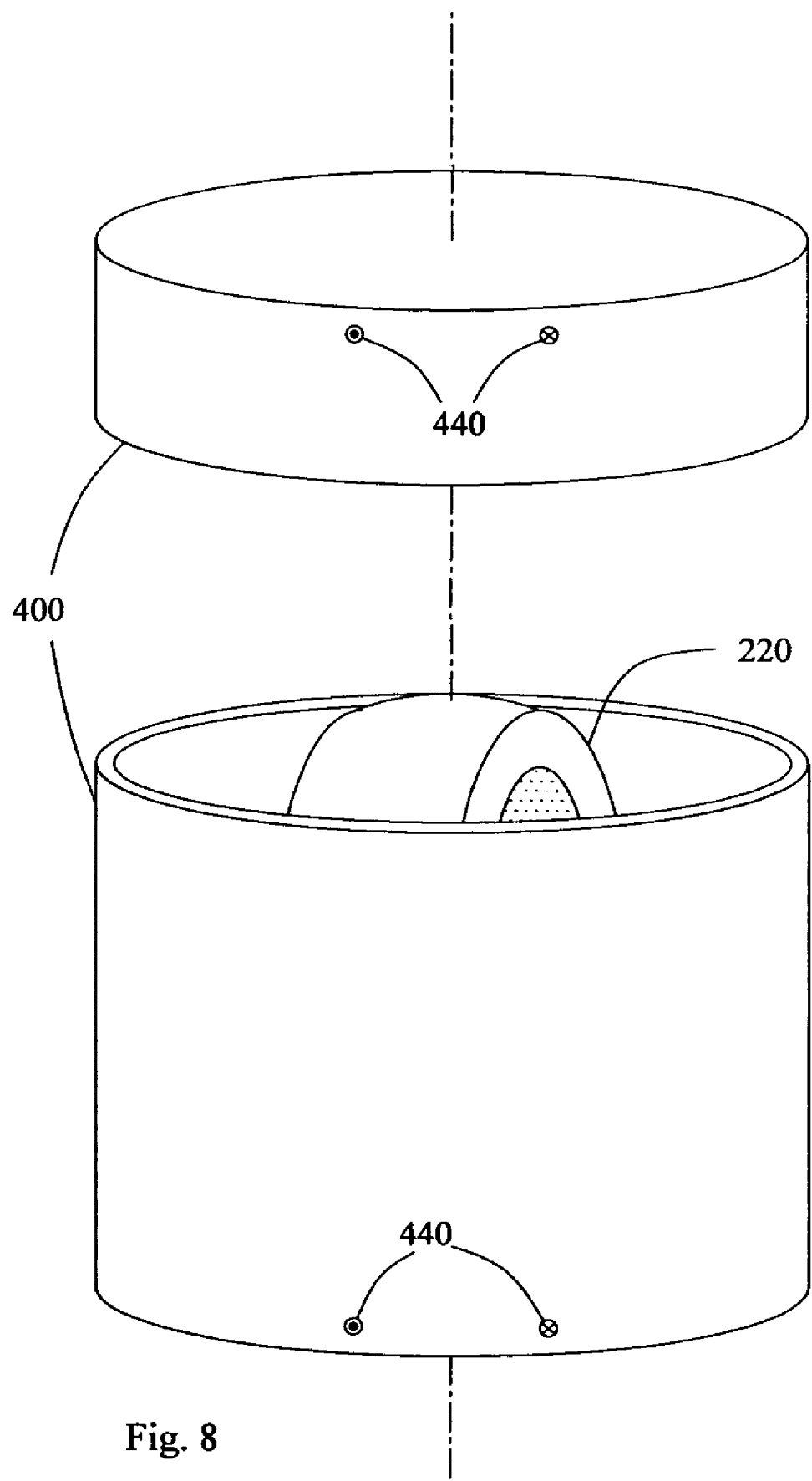
FIG. 8 shows an access to the flywheel and the output terminals of armature windings.

100 dynamo system
200 shaft
220 flywheel
240 magnet
300 circular track
320 coupler
340 bearing
400 frame
420 armature
440 windings
460 pole
480 shoe

DESCRIPTION

A dynamo system has many parts. It includes a flywheel mounted on a shaft intermediate its ends. A circular track in the dynamo system includes an inward groove structure to keep the ends of the shaft tracked inside, while the flywheel is rotating and spinning. The circular track means further includes a mechanism to allow a coupling means dangling around the flywheel. The pair of coupling means further includes means for bearing the shaft ends and dangling the shaft ends inside the circular track means, so that the shaft ends will move freely along the circular course of the circular track means while the flywheel is rotating and spinning. The coupling means also includes a bearing to carry an end of the shaft. The coupling means further includes a mechanism to dangle the bearing around the course of the circular track means. A frame holds the circular track means. The cavity of the frame has sufficient space so that the flywheel can rotate and spin freely. A plurality of permanent or electro magnets are mounted in spaced relationship on the rim of the flywheel. Further, a plurality of armatures are mounted to the undersurfaces of the frame for producing induced electrical power when the magnets sweep over the frame. Therefore, the induced electrical power can be used by an external load. The dynamo system may be used as a motor to produce mechanical motion for an external drive.

The present invention is illustrated in FIG. 1, a dynamo system 100.

As shown in FIG. 1 and FIG. 8, a frame 400 is a hollow cylindrical structure with round lids attached to both opening ends. The center axial line of the hollow cylindrical structure intersects the round lids at their center points.

As shown in FIG. 1 and FIG. 3, an armature 420 comprises a pole 460, a shoe 480, and windings 440. The pole 460 is constructed of dynamo steel and mounted to the undersurfaces of the round lids of the frame 400 after the assembly of the windings 440. The center line of the armature 420 is aligned with the center axial line of the hollow cylindrical structure of the frame 400. The shoe 480 is constructed of dynamo steel as well. The shoe 480 is curved and it is wider than the pole 460 cross section to obtain more fluxes from magnetic fields of magnets 240, and also to allow the spreading of the fluxes more uniformly. So that more induced electrical power can be generated at the output terminals of the windings 440. The windings 440 include insulated electrical conductive coils, insulated from each other, and from the pole 460, the shoe 480 and the frame 400. Depending on the design requirements, the windings 440 can have multiple sets of insulated coils in either series or parallel fashions. Therefore, the required voltage and current of the induced electrical power can be obtained at the output terminals of the windings 440. More armatures 420 can be mounted to the undersurfaces of the frame 400 other than the proximate center areas of the round lids. The proximate center areas of the round lids of the frame 400 are the places where the center axial line of the cylindrical frame 400 intersects at the round lids. These additional armatures 420 will produce induced electrical power only when the magnets 240 sweep over them.

As shown in FIG. 1, the frame 400 has a circular track 300 attached inside. The center axial line of the circular track 300 is aligned with the center axial line of the frame 400. As shown in FIG. 1 and FIG. 4 to FIG. 6, the circular track 300 serves as a course to allow a pair of couplers 320 dangling around the circular track 300 freely. The coupler 320 includes a bearing 340 to carry a shaft 200 at its end. The coupler 320 further includes a mechanism to dangle the bearing 340 around the course of the circular track 300. Accordingly, the coupler 320 dangles the end of the shaft 200 around the course of the circular track 300 as well. The circular track 300 includes an inward groove structure to keep the end sections of the shaft 200 tracked inside while a flywheel 220 rotating and spinning inside the frame 400. The circular track 300 further includes a mechanism to allow the coupler 320 dangling around it. Alternatively, the pair of the couplers 320 shown in FIG. 6 can be constructed into an integrated coupler 320 as shown in FIG. 7 and functionalities are still maintained.

As shown in FIG. 1, FIG. 2A and FIG. 2B, the cavity of the frame 400 accommodates an assembled set of the shaft 200 and the flywheel 220. Further more, the cavity of the frame 400 provides sufficient space to allow the assembled set of the shaft 200 and the flywheel 220 rotating and spinning inside freely. Though, as shown in FIG. 1 and FIG. 8 that the frame 400 is a hollow cylindrical structure with round lids attached to both opening ends, the frame 400 can be in any appropriate shapes, such as a round body or an oval, etc.

As shown in FIG. 1, FIG. 2A and FIG. 2B, the shaft 200 has mounted intermediate its ends the flywheel 220. A plurality of permanent or electro magnets 240 are mounted in spaced relationship on the rim of the flywheel 220 to ensure the flywheel 220 balanced.

Figure 9:
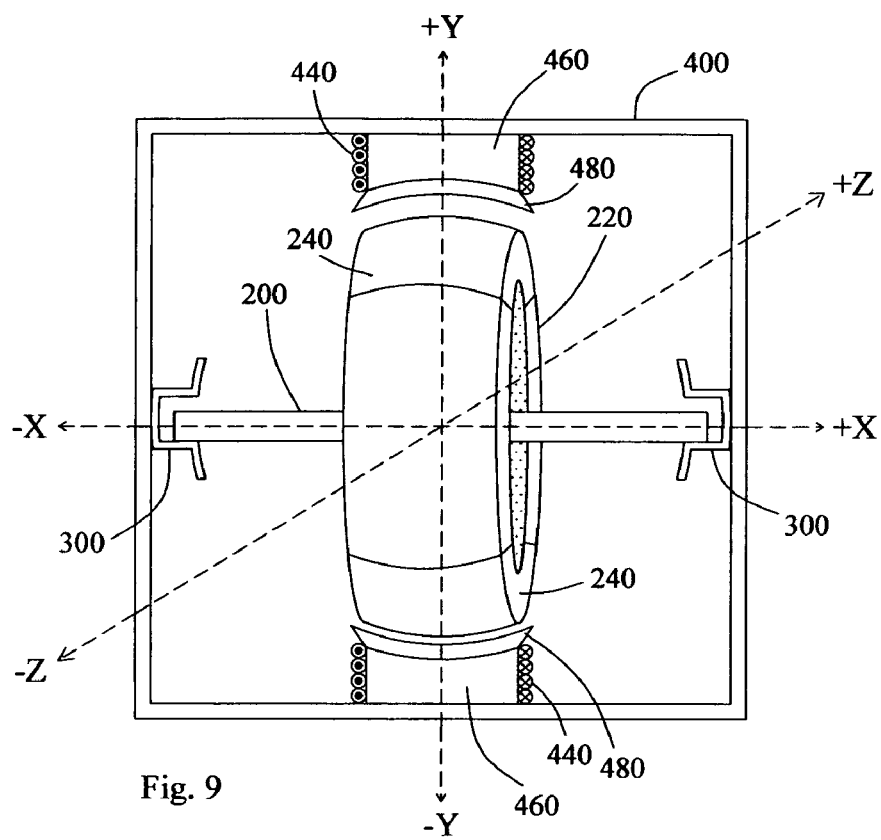
FIG. 9 shows a simplified figure to illustrate the contacts between the ends of the shaft and the inner side walls of the inward groove structure of the circular track for the flywheel to spin around the Y-axis.
Figure 10:
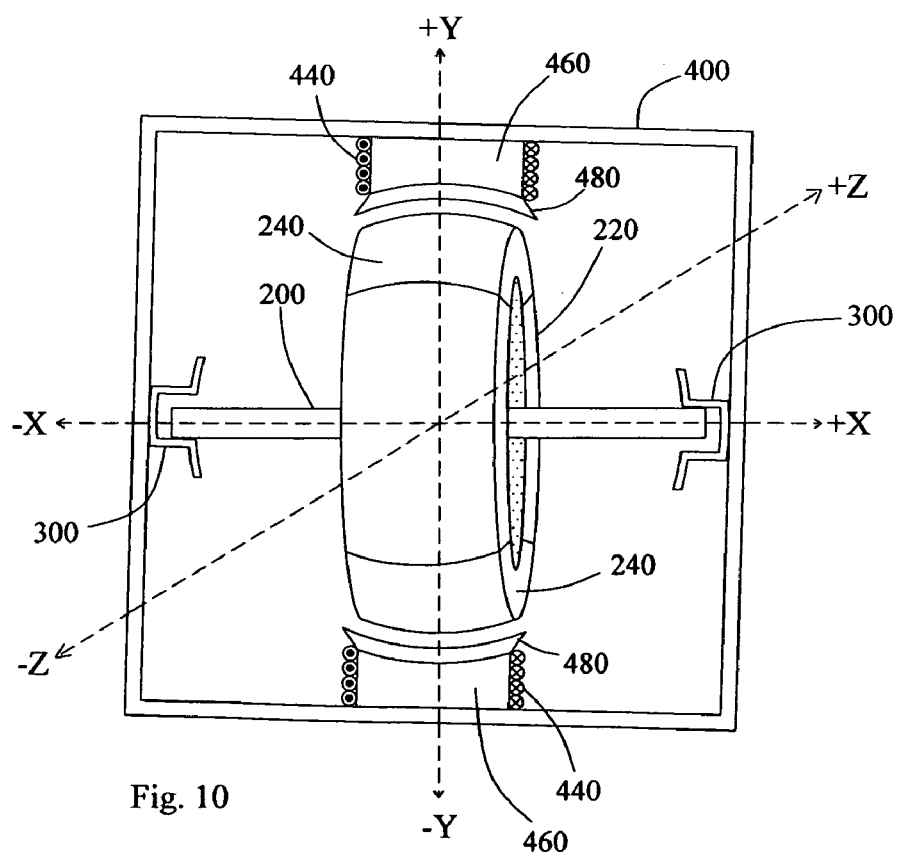
FIG. 10 shows a simplified figure to illustrate the contacts between the ends of the shaft and the inner side walls of the inward groove structure of the circular track for the flywheel to rotate around the X-axis and spin around the Y-axis.

As shown in FIG. 1, the bearings 340 of the couplers 320 carry the shaft 200 at its near ends and allow the shaft 200 rotating freely. The end sections of the shaft 200 are extended into the inward groove structure of the circular track 300 so that the end sections of the shaft 200 can touch the inner side walls of the inward groove structure of the circular track 300 as shown in FIG. 9 and FIG. 10.

The inward groove structure of the circular track 300 can have various groove shapes, such as U-shape, V-shape, etc. Accordingly, the end sections of the shaft 200 can be properly designed in such that the contacts between the inner side walls of the inward groove structure of the circular track 300 and the end sections of the shaft 200 are optimal.

Further more, the surfaces of the end sections of the shaft 200 and the surfaces of the inner side walls of the inward groove structure of the circular track 300 can be processed so that the frictions between the end sections of the shaft 200 and the inner side walls of the inward groove structure of the circular track 300 are optimal.

When the magnets 240 sweep over the armatures 420, armature fluxes are created. The dynamo system 100 can further include armature flux return paths between the armatures 420. For example, a flat piece of dynamo steel is mounted to the undersurfaces of the frame 400. The flat piece of dynamo steel inter-connects the poles 460. These magnetic circuit return paths will improve the induced electrical power outputs of the armatures 420.

Also the dynamo system 100 can further include magnetic flux return paths between the magnets 240 to improve the induced electrical power outputs of the armatures 420. For example, the magnetic flux return paths can be a piece of dynamo steel inside the flywheel 220 for interconnections of the magnets 240.

To cool the dynamo system 100, air circulation mechanisms can be included, for example, adding fan paddles to the shaft 200 or the flywheel 220 as long as the flywheel 220 maintains balanced. The mechanisms will circulate air inside the cavity of the frame 400 and force the air flow into and out of the dynamo system 100 through window openings on the frame 400.

OPERATION

Physically, the flywheel 220 is a gyro wheel. Rigidity of the flywheel 220 tends to remain its rotating axis, the shaft 200, in a fixed direction in space if no force is applied to it. Precession of the flywheel 220 has a tendency to turn its shaft 200 at a right angle to the direction of an applied force. When the applied force continues, the procession keeps turning the shaft 200 at a right angle accordingly. Therefore, the flywheel 220 spins. The dynamo system 100 is based on the rigidity and precession to function.

As shown in FIG. 9 and FIG. 10, the shaft 200 is aligned with the X-axis. The center axial line of the hollow cylindrical frame 400 is aligned with the Y-axis. The frame 400 has the circular track 300 attached inside. The circular track 300 is placed in parallel with the X-Z plane and the center axial line of the circular track 300 is aligned with the Y-axis. Both FIG. 9 and FIG. 10 are simplified figures for the purpose of illustrating the relationships between the end sections of the shaft 200 and the inner side walls of the inward groove structure of the circular track 300. The inner side walls are the bottom side wall and the top side wall of the inward groove structure of the circular track 300.

As illustrated in FIG. 9, when a tangent force applied to spin the hollow cylindrical frame 400 around the Y-axis, the circular track 300 also spins around its center axial line simultaneously. For illustration, it is assumed that the spinning around the Y-axis is in the counterclockwise direction. Frictions are, therefore, created between each end section of the shaft 200 and the bottom side wall of the inward groove structure of the circular track 300.

Since the flywheel 220 is balanced, the friction applied to the left end section of the shaft 200 (shown in the –X axis) equals the friction applied to the right end section of the shaft 200 (shown in the +X axis). However, the frictions are pointing to the opposite directions. These cause the left end section of the shaft 200 to rotate clockwise around the X axis and the right end section of the shaft 200 to rotate counterclockwise around the X axis. Consequently, the flywheel 220 begins spinning counterclockwise around the Y axis but not rotating around the X axis. That is, the flywheel 220 begins spinning around the center axial line of the circular track 300 but no rotation around the axis of the shaft 200 at all.

As illustrated in FIG. 10, in order to rotate the flywheel 220 around the X axis, an additional force is required. This second force tilts the frame 400 so that the bottom side wall of the inward groove structure of the circular track 300 touches the left end section of the shaft 200 and the top side wall of the inward groove structure of the circular track 300 touches the right end section of the shaft 200 simultaneously.

Since the flywheel 220 is balanced, the friction created between the left end section of the shaft 200 and the bottom side wall of the inward groove structure of the circular track 300 equals the friction created between the right end section of the shaft 200 and the top side wall of the inward groove structure of the circular track 300. The friction applied to the left end section of the shaft 200 rotates the shaft 200 clockwise. The friction applied to the right end section of the shaft 200 rotates the shaft 200 clockwise as well. Therefore, the flywheel 220 not only spins around the Y axis but also rotates around the X axis. That is, the flywheel 220 not only spins around the center axial line of the circular track 300 but also rotates around the axis of the shaft 200.

Since the center axial line of the hollow cylindrical frame 400, the center axial line of the circular track 300, and the Y axis are all aligned, the optimal places to mount the armatures 420 are the proximate undersurface areas of the frame 400 where the center axial line of the circular track 300 intersects at the center points of the round lids of the frame 400. And the centerlines of the armatures 420 are aligned with the center axial line of the circular track 300. When the flywheel 220 rotates and spins, these alignments will ensure that the fluxes coming out of the magnets 240 will always sweep over the armatures 420. Therefore, the optimal induced electrical power outputs are generated at the output terminals of the windings 440.

More armatures 420 can be mounted to the undersurfaces of the frame 400 away from the center axial line of the circular track 300. Depending on the spinning rate of the flywheel 220, the induced electrical power will only be generated when the magnets 240 sweep over these armatures 420.

As shown in FIG. 8, to facilitate driving the flywheel 220 to rotate around the shaft 200 initially, tangent forces can apply to the curve surfaces of the flywheel 220 through the openings of the frame 400. Also, the initial rotating momentum can be achieved through an electrical control means of providing electrical power to the windings 440.

Since the dynamo system 100 is a rotating electric machine, it is capable of converting mechanical energy into electric energy (a generator) or electric energy into mechanical energy (a motor). When the invention serves as a motor, the movement of the entire body of the dynamo system 100 or the flywheel 220 may be used as a mechanical driving source for applications such as grinding, mixing, and so on.

CONCLUSION, RAMIFICATIONS, AND SCOPE

Accordingly, the reader will see that the dynamo system 100 of this invention is a rotating electrical machine. It can be used to convert mechanical energy into electric energy and may be used to convert electric energy into mechanical energy. Furthermore, the dynamo system 100 has the additional advantages in that it is scalable; the miniaturized dynamo system 100 can be human powered to produce electrical energy for use by handheld electronic devices; the large scaled dynamo system 100 can be driven by a variety of mechanical forces, such as wind or water flow energies, to produce electrical energy for specific application needs.

When the miniaturized dynamo system 100 driven by a human power, the speed at which the relative movement between the armatures 420 and the magnets 240 is high. That is, the flywheel 220 of the dynamo system 100 can reach high speed by a human powered driving force. Therefore, the miniaturized dynamo system 100 is an efficient and fuel-free portable electrical generator for a variety of applications.

When the dynamo system 100 used as a motor, the mechanical movement of the flywheel 220 or entire body of the dynamo system 100 may be used as a source of a driving force.

Although the description above containing many specificities, these should not be construed as limiting the scope of the invention but as merely providing illustrations of the presently preferred embodiments of this invention. For examples, the dynamo system 100 can include an electrical circuitry for converting an alternate current (AC) output into a direct current (DC) output; the magnets 240 may be arranged to become a DC electrical power generator; fans can be added to the flywheel shaft 200 to circulate air for cooling; the dynamo system 100 can be an embedded component of an apparatus; the inward groove structure of the circular track 300 can have a variety of groove shapes, such as a U-groove or a V-groove, etc., a variety of geometrical shapes and mechanisms for designing the circular track 300 and the coupler 320 so that the ends of the shaft 200 can be properly tracked inside the inward groove structure of the circular track 300 and move freely while the flywheel 220 rotating and spinning, etc.

Thus the scope of the invention should be determined by the appended claims and their legal equivalents, rather than by the examples given.

I claim:

1. A dynamo system for providing an electrical power output, comprising:
  (a) a shaft;
  (b) a flywheel mounted on said shaft intermediate its ends;
  (c) a circular track means for providinq a circular course along which said shaft's ends can be tracked inside and freely moved while said flywheel rotating and spinning; said circular track means includes an inward groove structure to keep said shaft's ends tracked inside while said flywheel rotating and spinning; said circular track means further allow a coupling means dangling around;
  (d) a pair of said coupling means for bearing said shaft's ends and dangling said shaft's ends inside said circular track means so that said shaft's ends will be tracked inside said inward groove structure of said circular track means and also move freely along said circular course of said circular track means while said flywheel rotating and spinning; said coupling means includes a bearing to carry an end of said shaft; said coupling means further includes a mechanism to dangle said bearing around said circular course of said circular track means;

(e) a frame for holding said circular track means; a cavity of said frame having sufficient space so that said flywheel can rotate and spin freely;

(f) a plurality of permanent or electro magnets mounted in spaced relationship on the rim of said flywheel;

(g) a plurality of armatures being mounted to undersurfaces of said frame for producing induced electrical power when said magnets sweeping over said armatures.

2. The dynamo system of claim 1 wherein said armatures are mounted to proximate undersurfaces of said frame where the center axial line of said circular track means intersecting at said frame; whereby said magnets will improve chances to sweep over said armatures while said flywheel rotating and spinning.

3. The dynamo system of claim 1, further including a wall friction means for providing proper surface friction to the inner side walls of said inward groove structure of said circular track means; whereby proper frictions between said shaft's ends and said inner side walls of said inward groove structure of said circular track means are achieved; and also said wall friction means prevents said shaft's ends from slipping inside of said inward groove structure of said circular track means while said flywheel rotating and spinning.

4. The dynamo system of claim 1, further including a shaft friction means for providing proper surface friction to said shaft's ends; whereby proper frictions between said shaft's ends and said inner side walls of said inward groove structure of said circular track means are achieved; and also said shaft friction means prevents said shaft's ends from slipping inside of said inward groove structure of said circular track means while said flywheel rotating and spinning.

5. The dynamo system of claim 1, further including a tilting means for always keeping one end of said shaft touched to one inner side wall of said inward groove structure of said circular track means and keeping the other end of said shaft touched to the other inner side wall of said inward groove structure of said circular track means; whereby said flywheel will rotate and spin with only one force applied to said frame in the direction tangent to said circular track means.

6. The dynamo system of claim 1 wherein said pair of coupling means can be constructed into an integrated coupling means; whereby said integrated coupling means will simplify the mechanism to dangle said bearings around said circular track means.

* * * * *